United States Patent [19]

Pietrocini et al.

[11] 3,894,678

[45] July 15, 1975

[54] METHOD OF BONDING SINTERED IRON ARTICLES

[75] Inventors: Thomas W. Pietrocini, Jeffersonville, Ind.; Roy S. Goodwin; Frederick H. Parker, both of St. Thomas, Canada

[73] Assignee: Gould Inc., Chicago, Ill.

[22] Filed: Mar. 13, 1974

[21] Appl. No.: 450,898

[52] U.S. Cl. ............. 228/207; 29/182.2; 29/182.5; 228/223 RX; 228/249 RX; 228/253 RX
[51] Int. Cl. ........................................... B23k 31/02
[58] Field of Search ....... 29/490, 494, 472.9, 473.1, 29/182.5, 182.2

[56] References Cited
UNITED STATES PATENTS 3,224,071  12/1965  Levi et al. ........................ 29/490 X
3,246,395  4/1966  Galmiche ............................ 29/494

*Primary Examiner*—Carl E. Hall
*Attorney, Agent, or Firm*—Edward E. Sachs

[57] ABSTRACT

Sintered iron articles are bonded together by oxidizing a substantial portion of the iron forming the articles to $Fe_3O_4$, preparing the faying surfaces for bonding, interposing brazing filler metal between the faying surfaces, and then heating the parts to form a brazed bond therebetween. This invention relates to the field of bonding metal articles, and more particularly, to an improved method of bonding together sintered iron articles.

12 Claims, No Drawings

3,894,678

METHOD OF BONDING SINTERED IRON ARTICLES

BACKGROUND OF THE INVENTION

Sintered iron articles are inherently porous. This is believed to be a principal contributing factor to the failure of many conventional bonding procedures to produce sound metallurgical bonds between sintered iron articles. Apparently, the bonding material, whether it be a liquid at ambient temperatures, or molten, is carried away from the faying surfaces of the articles by capillary action induced by the interconnecting pores of the sintered iron articles. This tends to produce a weakened bond, a highly stressed bond, or no bond at all, depending upon the bonding technique employed.

Five techniques are known to us to have been practiced by the prior art. Each suffers one or more disadvantages. These techniques and their attendant disadvantages are as follows:

Copper Infiltration -

This involves filling the pores in the sintered iron articles with molten copper. In addition to being an expensive procedure, it does not work well with bonding media requiring the use of elevated temperatures above the melting point of copper. Under such conditions, the infiltrated copper remelts and continues to flow through the pores in the sintered iron articles away from the faying surfaces of the parts.

Densification -

This procedure involves increasing the density of the sintered articles to about 7.2 gm/cc. which is 92 percent of the density of solid iron. In this way, the porosity is reduced to a level where its interference with conventional bonding techniques is minimized. The procedure, however, requires the use of massive and therefore expensive compacting equipment. This treatment is generally regarded as applicable only to small simple shapes.

Reactive Bonding Alloy -

By this procedure, a bonding alloy is employed which metallurgically reacts with the sintered iron, incurring an interstitial volume change, blocking the pores of the sintered iron. Suitable alloys are difficult and expensive to manufacture due to their oxidation in stability. This also requires the use of special atmospheres during the bonding operation which can result in unpredictable bond strengths.

Sinter Bonding Two Parts With Different Growth Characteristics -

This procedure results generally in only partial bonding. Thus, the strength attained varies with the degree of diffusion that takes place and is not completely reliable.

Welding -

The welding matrix is frequently carried away from the faying surfaces by capillary action. This produces shrinkage which sets up severe stresses at the bond line.

SUMMARY OF THE INVENTION

It is the principal object of the present invention to overcome the foregoing problems attendant the prior art bonding procedures by providing an improved method of effecting a metallurgical bond between sintered iron articles which is similar in strength to bonds obtained with wrought steel.

In accordance with the present invention, sintered iron articles to be bonded together are first treated, for example by exposure to dry steam at selected elevated temperatures, to convert a substantial portion of the iron forming the articles to $Fe_3O_4$. The faying surfaces may be masked prior to this treatment to protect them from oxidation. If not, it will be necessary to remove oxide from the faying surfaces as by fluxing, or mechanical means, such as abrading before bonding the articles together. Where a mask is employed, it is removed upon completion of the oxidation step and prior to further processing.

Formation of $Fe_3O_4$ takes place in the interior of the pores as well as on the outer surface of the sintered iron articles, thereby reducing the porosity of the articles. Once this is accomplished, conventional bonding techniques such as brazing, soldering, and welding may be used to bond the articles together. Brazing is the preferred technique. This involves interposing brazing filler metal between the faying surfaces of the articles and then heating the articles to a temperature for a time sufficient to form a brazed bond therebetween. The brazing filler metal may take the form of a shim, a paste, or a powder.

In accordance with the preferred embodiment of the invention, the oxidation step is accomplished by treating the articles with dry (superheated) steam at a temperature within the range of above about 300°C to about 570°C for a time sufficient to convert a substantial portion of the iron forming the parts to $Fe_3O_4$. Thereafter, the faying surfaces are prepared for bonding and then bonded together, preferably by brazing the articles.

It is therefore an object of the invention to provide an improved method for bonding together sintered iron articles.

A further object of the invention is to provide a method for bonding together sintered iron articles by first oxidizing to $Fe_3O_4$ a substantial portion of the iron forming the articles, and thereafter forming a brazed bond between the parts.

These and other objects and features of the invention will be more apparent upon a complete reading of the following description of the invention, which includes the best mode presently contemplated for practicing the invention.

DESCRIPTION OF THE PREFERRED EMBODIMENT

The present invention contemplates bonding together sintered iron articles which contain at least about 51% iron. The remaining proportion of the parts may comprise copper, nickel, and other typical ferrous alloying elements.

In general, the density of the sintered iron articles will be within the range of from about 4.2 gm/cc. to about 7.0 gm/cc. and preferably from about 4.2 gm/cc. to about 6.7 gm/cc. Parts having a density in excess of 6.7 gm/cc. possess a sufficiently low degree of porosity that conventional bonding techniques such as welding can be satisfactorily employed without the oxidation pretreatment. While the method of the present invention can be practiced on these higher density materials, it is generally difficult to justify because of the additional steps and higher cost involved.

The preferred procedure for oxidizing the sintered iron articles is by treating the parts with dry steam. When exposed to dry steam at temperatures within the range of in excess of about 300°C to about 570°C, the iron combines with water to produce $Fe_3O_4$ and hydrogen.

Superheated steam must be used since the presence of condensed water will result in the formation of $Fe_2O_3$. This is undesirable since the lower oxide does not adhere to the iron and also promotes rusting. Similarly, the heat treating temperature should be controlled so that it does not rise above about 570°C since FeO is likely to be formed. This is undesirable because FeO is unstable at temperatures below 570°C, and dissociates into $Fe_3O_4$ and metallic iron. However, because the $Fe_3O_4$ acts as a protective layer for the FeO, the latter becomes entrapped beneath the $Fe_3O_4$ and shows a marked proneness to corrosion.

Temperatures below about 300°C will not produce the desired $Fe_3O_4$, and 360°C is considered to be a practical lower limit, with 450°C as a preferred minimum temperature considering the time-temperature relationship discussed below.

If the sintered iron article were formed entirely of iron and conversion to $Fe_3O_4$ were complete, this would result in a calculated weight increase of about 38.2 percent. It has been found, however, that weight increases up to about 7.8 percent at equilibrium have actually been achieved, indicating a conversion of about 20 percent of the iron to $Fe_3O_4$.

For purposes of the present invention, conversions of about 5 to about 20 percent of the iron forming the sintered iron articles is considered to constitute a conversion of a substantial portion of the iron and will produce satisfactory results. It is preferred, however, that at least about 10 percent of the iron present be converted to $Fe_3O_4$.

The length of time it takes to reach a desired level of conversion of iron to $Fe_3O_4$ depends on a number of factors including the density of the sintered iron article, the size of the pores, the proportion of iron to other ingredients forming the article, and the temperature of the steam employed. Higher temperatures tend to accelerate the rate of oxidation. In general, it has been found that conversion of a substantial amount of iron takes place in as little as 30 minutes, but in some circumstances may take as long as 5 hours at 570°C. In most instances, however, the steam treatment should extend over a period of 2 hours at a temperature within the range of about 450°C to about 570°C to insure adequate oxidation of the iron.

In accordance with one embodiment of the invention, the faying surfaces of the sintered iron parts are masked, for example with a slurry of graphite and alcohol prior to oxidation of the sintered iron articles. This is done to protect the faying surfaces from oxidation. When this procedure is followed, it is merely necessary to remove the mask after the oxidation step is completed and then proceed with the bonding steps of the method. Where graphite is employed as a masking material, it can be removed by wiping the surface.

Alternatively, the parts can be subjected to oxidation without the use of the mask, in which event it is necessary to remove, for example by fluxing, acid dip; grinding or other mechanical means, the oxide present on the faying surfaces of the articles.

After the oxide or the mask is removed, depending on which of the foregoing procedures is followed, the faying surfaces are interfaced with brazing filler metal. This can take the form of a shim, a paste, or a powder. The faying surfaces are then brought into pressure contact and the articles are heated to a suitable elevated temperature, depending upon the composition and melting temperature of the brazing filler metal, and maintained at that temperature until the filler metal melts. The workpiece is then cooled whereby a metallurgical bond is formed between the sintered iron articles. Where a flux has been used, excess should be removed, for example by water washing.

Heating may be accomplished by a variety of conventional means, including torch, furnace, induction heating, radiant heating, resistance heating and the like, depending upon the size and thickness of the parts being bonded.

In some instances, it may be desirable to effect the brazing in a reducing atmosphere to remove the $Fe_3O_4$ from the outer surfaces of the articles. This reduction must be accomplished with care to insure that the $Fe_3O_4$ in the pores of the sintered iron is not reduced, as this will permit the brazing filler metal to be wicked away from the joint by capillary action.

Brazing filler metals which may be used in the practice of the present invention include the wide variety of commercially available compositions for brazing ferrous metals. These include those falling under AWS-ASTM Classification BAg; BCu; and RBCuZn. Specific filler metal compositions falling within these classifications are as follows:

BAg FILLER METALS

| AWS-ASTM Classification | Nominal Composition, percent | | | | | Temperature °F | | |
|---|---|---|---|---|---|---|---|---|
| | Ag | Cu | Zn | Cd | Others | Solidus | Liquidus | Brazing Range |
| BAg-1 | 45 | 15 | 16 | 24 | — | 1125 | 1145 | 1145–1400 |
| BAg-1a | 50 | 15.5 | 16.5 | 18 | — | 1160 | 1175 | 1175–1400 |
| BAg-2 | 35 | 26 | 21 | 18 | — | 1125 | 1295 | 1295–1550 |
| BAg-3 | 50 | 15.5 | 15.5 | 16 | Ni 3 | 1170 | 1270 | 1270–1500 |
| BAg-4 | 40 | 30 | 28 | — | Ni 2 | 1240 | 1435 | 1435–1650 |
| BAg-5 | 45 | 30 | 25 | — | — | 1250 | 1370 | 1370–1550 |
| BAg-6 | 50 | 34 | 16 | — | — | 1270 | 1425 | 1425–1600 |
| BAg-7 | 56 | 22 | 17 | — | Sn 5 | 1145 | 1205 | 1205–1400 |
| BAg-8 | 72 | 28 | — | — | — | 1435 | 1435 | 1435–1650 |
| BAg-8a | 72 | 27.8 | — | — | Li 0.2 | 1410 | 1410 | 1410–1600 |
| BAg-13 | 54 | 40 | 5 | — | Ni 1 | 1325 | 1575 | 1575–1775 |
| BAg-18 | 60 | 30 | — | — | Sn 10 | 1115 | 1325 | 1325–1550 |
| BAg-19 | 92.5 | 7.3 | — | — | Li 0.2 | 1435 | 1635 | 1610–1800 |

BCu AND RBCuZn FILLER METALS

| AWS-ASTM Classification | Nominal Composition, percent | | | | Solidus | Liquidus | Brazing Range |
| --- | --- | --- | --- | --- | --- | --- | --- |
| | Cu | Zn | Sn | Ni | | | |
| BCu-1 | 99.90 min | — | — | — | 1980 | 1980 | 2000–2100 |
| BCu-1a | 99 min | — | — | — | 1980 | 1980 | 2000–2100 |
| BCu-2 | 86.5 min | — | — | — | 1980 | 1980 | 2000–2100 |
| RBCuZn-A | 59.25 | 40 | 0.75 | — | 1630 | 1650 | 1670–1750 |
| RBCuZn-D | 48 | 42 | — | 10 | 1690 | 1715 | 1720–1800 |

In general, AWS brazing fluxes of type No. 4 are suitable for use with brazing filler metal Classification BAg. Such fluxes contain chlorides, fluorides, borates and are available in powder and paste form. AWS brazing fluxes of type No. 3B are suitable for use with brazing filler metal Classification BCu and RBCuZn. Such fluxes contain boric acid, borates, fluorides, fluoborates and are available in powder, paste and liquid form.

The invention has been described with reference to certain specific embodiments, neither the embodiments illustrated nor the terminology employed in describing them is intended to be limiting; rather it is intended to be limited only by the scope of the appended claims.

Having thus described a specific preferred embodiment of the invention, the following is claimed:

1. A method of bonding together sintered iron articles comprising the steps of
   a. treating said articles with dry steam at a temperature within the range of above about 300°C to about 570°C for a time sufficient to convert a substantial portion of the iron forming said articles to $Fe_3O_4$,
   b. removing oxide from the faying surfaces of said articles,
   c. interposing brazing filler metal between the faying surfaces,
   d. heating said articles to a temperature and for a time sufficient to melt said filler metal, and
   e. cooling the workpiece to produce a metallurgical bond.

2. The method defined in claim 1 wherein step (b) is performed by fluxing said surfaces.

3. The method defined in claim 1 wherein step (b) is performed by mechanically removing the oxide.

4. The method defined in claim 1 wherein said brazing filler metal is in the form of a shim.

5. The method defined in claim 1 wherein said brazing filler metal is in the form of a paste.

6. The method defined in claim 1 wherein step (a) is conducted at a temperature within the range of about 450°C to about 570°C.

7. The method defined in claim 1 wherein step (d) is conducted in a reducing atmosphere.

8. A method of bonding sintered iron articles comprising the step of
   a. oxidizing to $Fe_3O_4$ a substantial portion of the iron forming said articles,
   b. preparing the faying surfaces of said articles for bonding,
   c. interfacing said faying surfaces with brazing filler metal, and
   d. heating said parts to melt the brazing metal.

9. The method defined in claim 8 wherein step (a) is conducted in the presence of dry steam.

10. The method defined in claim 9 wherein step (a) is conducted at a temperature within the range of above about 300°C to about 570°C.

11. A method of bonding together sintered iron articles comprising the step of
   a. masking the faying surfaces of the articles,
   b. exposing the parts to dry steam at a temperature within the range of above about 300°C to about 570°C for a time sufficient to convert a substantial portion of the iron forming said articles to $Fe_3O_4$,
   c. removing the mask from the faying surfaces,
   d. interposing brazing filler metal between the faying surfaces, and
   e. heating said parts to melt said brazing filler metal.

12. The method defined in claim 11 wherein step (b) is conducted at a temperature within the range of about 450°C to about 570°C.

* * * * *